United States Patent [19]

Smotherman

[11] Patent Number: 5,452,767
[45] Date of Patent: Sep. 26, 1995

[54] VEGETATION REMOVAL APPARATUS

[76] Inventor: Robert J. Smotherman, 5430 Burkett La., Loomis, Calif. 95630

[21] Appl. No.: 275,992

[22] Filed: Jul. 15, 1994

Related U.S. Application Data

[63] Continuation-in-part of Ser. No. 147,494, Nov. 4, 1993, Pat. No. 5,330,010, which is a continuation-in-part of Ser. No. 939,018, Sep. 2, 1992, Pat. No. 5,261,496.

[51] Int. Cl.⁶ .............................. A01B 33/06; A01D 9/06
[52] U.S. Cl. ................................ 172/25; 172/378; 294/50
[58] Field of Search ............................... 172/21, 22, 378, 172/110, 25, 27, 28; 294/50, 50.6

[56] References Cited

U.S. PATENT DOCUMENTS

| | | |
|---|---|---|
| D. 322,918 | 1/1990 | Parks . |
| 1,549,198 | 8/1925 | Haney . |
| 1,931,773 | 10/1933 | Sobol .................................. 294/50.6 |
| 2,250,313 | 7/1941 | Petz et al. . |
| 2,402,550 | 6/1946 | Hiack . |
| 2,593,283 | 4/1952 | Erlebach . |
| 2,603,744 | 7/1952 | Ramirez . |
| 2,680,643 | 6/1954 | Cravotta . |
| 2,689,762 | 9/1954 | Krumm .............................. D94/50.6 |
| 2,804,336 | 8/1957 | Thompson . |
| 2,855,668 | 10/1958 | Ottenad et al. . |
| 2,862,755 | 12/1958 | Gulden . |
| 3,333,881 | 8/1967 | Hollinger . |
| 3,444,934 | 5/1969 | Alberto .................................. 172/25 |
| 3,596,966 | 8/1971 | Shredl . |
| 3,633,958 | 1/1972 | Mesrobian . |
| 3,663,050 | 5/1972 | Fuchs . |
| 3,830,310 | 8/1974 | Williams . |
| 4,641,712 | 2/1987 | Cravotta . |
| 4,723,802 | 2/1988 | Fambrough . |
| 4,819,736 | 4/1989 | Hedgepeth . |
| 4,832,131 | 5/1989 | Powell et al. .............................. 172/25 |
| 5,004,283 | 4/1991 | Sullivan . |
| 5,005,888 | 4/1991 | Parks et al. . |
| 5,261,496 | 11/1993 | Smotherman .......................... 172/378 |
| 5,330,010 | 7/1994 | Smotherman .......................... 172/378 |

FOREIGN PATENT DOCUMENTS 211366  11/1955  Australia .

Primary Examiner—David H. Corbin
Assistant Examiner—Spencer Warnick
Attorney, Agent, or Firm—John P. O'Banion

[57] ABSTRACT

An apparatus for extraction of weeds and other vegetation by hand or by using a power driver. The apparatus includes a hollow housing having at least one slot in which a planar shaft is slidably disposed. An extraction head is detachably coupled to the shaft, and can be extended or retracted by movement of the shaft within the housing. The extraction head can include a plurality of pointed prongs separated by a V-shaped notch, in which case the prongs are extended and inserted into the soil over the vegetation to be removed. Rotation of the apparatus winds the vegetation and its root around the prongs and removes it from the soil. The vegetation is then ejected from the apparatus by retracting the prongs and, if necessary, sliding the vegetation off of the housing. Alternatively, the extraction head can include clamping jaws or cutting edges which cut vegetation when the extraction head is retracted into the housing.

15 Claims, 5 Drawing Sheets

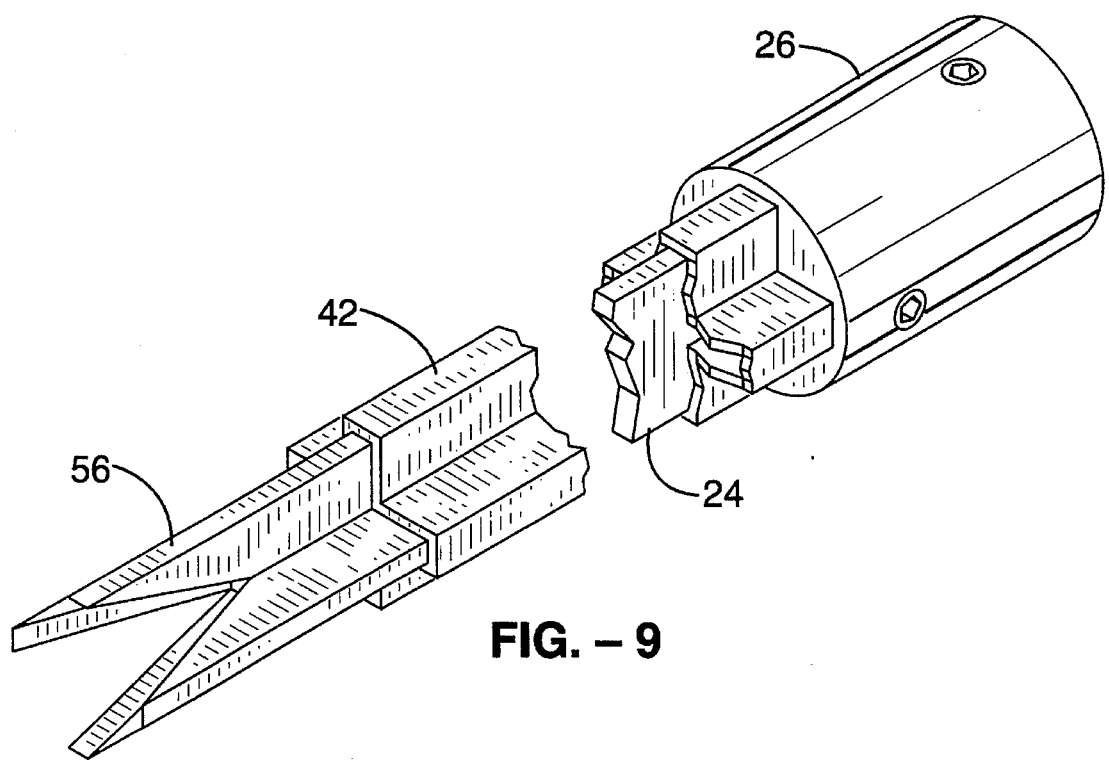
FIG. – 9
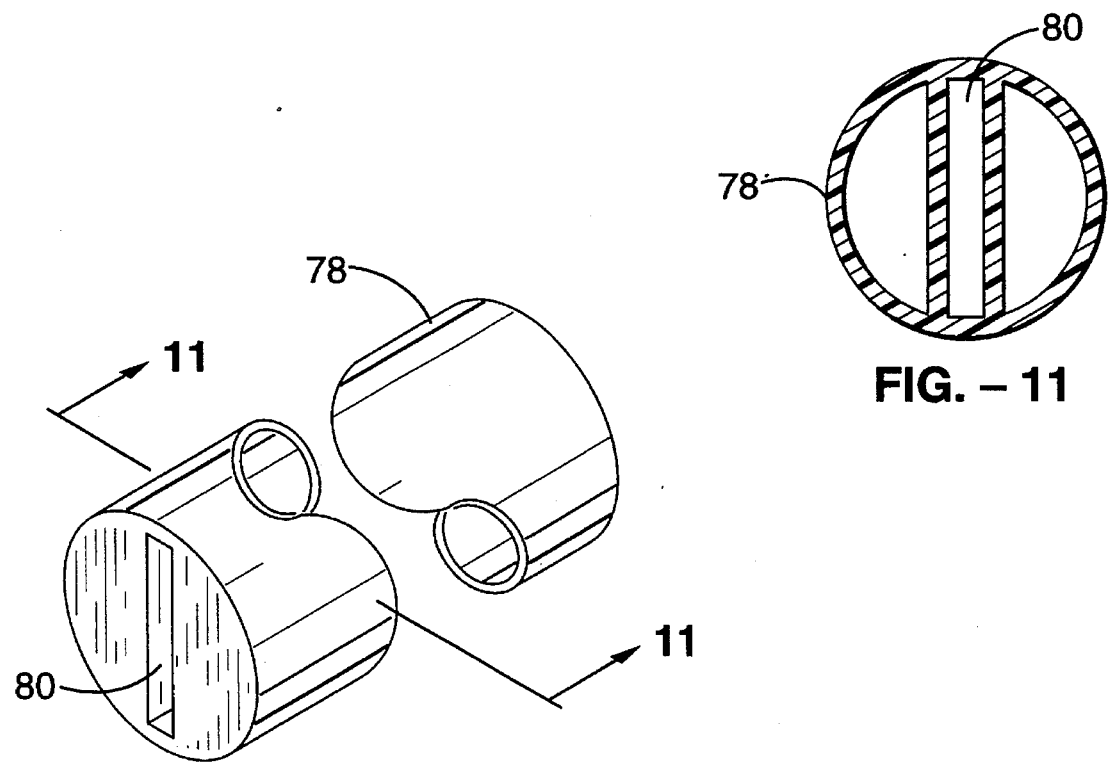
FIG. – 10
FIG. – 11

VEGETATION REMOVAL APPARATUS

CROSS REFERENCE TO RELATED APPLICATIONS

This is a continuation-in-part of application Ser. No. 08/147,494 filed on Nov. 4, 1993, now U.S. Pat. No. 5,330,010, which is a continuation-in-part of Ser. No. 07/939,018 filed on Sep. 2, 1992, now U.S. Pat. No. 5,261,496, both of which are incorporated by reference herein.

BACKGROUND OF THE INVENTION

1. Field of the Invention

This invention pertains generally to vegetation removal devices, and more particularly to a vegetation removal apparatus with interchangeable extraction heads which can be used for rotary removal of vegetation from the soil as well as for removal of vegetation above the ground.

2. Description of the Background Art

Vegetation removal from plant beds, lawns, and other areas can be a tedious task. To ease the removal of vegetation, a number of devices have been developed which include forks, tines or cutters which can be forced into the soil surrounding the vegetation and operated to either extract or cut the vegetation. When vegetation is cut, however, the root system remains and the vegetation will grow back over a period of time. Therefore, rotary removal is preferred since the root can be removed intact.

Rotary removal devices heretofore developed suffer from various disadvantages, most notably that the removed vegetation becomes entangled in the device and ejection of the weed from the extraction head is difficult. As a result, the user must unwrap or cut the vegetation in order to remove it from the device. Additionally, various types of vegetation have different growth patterns and cannot be effectively removed using a single extraction head configuration. Therefore, a need exists for a rotary extraction tool with interchangeable extraction heads which can effectively remove the vegetation and its roots, while at the same time providing for ease of ejection of the vegetation and minimizing entanglement.

SUMMARY OF THE INVENTION

The present invention overcomes the deficiencies in existing rotary vegetation extraction devices by employing a configuration and structure which provides for ease of ejectment and minimal entanglement of the vegetation with the device.

By way of example and not of limitation, the present invention generally comprises an elongated housing having at least one slot extending between each end, a shaft slidably disposed within the slot, an extraction head detachably coupled to one end of the shaft, and a receptacle coupled to the other end of the shaft for receiving a source of rotary motion such as a standard manual wrench ratchet handle, motorized ratchet handle, electric drill, power-take-off of a tractor, or the like. In the preferred embodiment, the housing includes two generally rectangular slots which intersect at their centers and which are oriented generally perpendicular to each other, thereby forming a "cross-shaped" configuration.

The extraction head includes a plurality of tapered prongs separated by a V-shaped notch. Preferably, the extraction head would have two, four or six prongs depending upon the type of weed to be extracted. In the two and six prong embodiment, the extraction head is generally planar. In a first four prong embodiment, all of the prongs also lie in the same plane. These extraction heads can be used where the housing includes either one or two slots. In a second four prong embodiment, two of the prongs lie in one plane and two of the prongs lie in an orthogonal plane, thereby forming a "cross-shaped" configuration which must be used where the housing includes the "cross-shaped" configuration of slots.

Other embodiments of extraction heads can also be employed. For example, the extraction head can be formed in a "hook-shaped" configuration with a cutting edge for cutting stalks of vegetation or for cutting limbs from trees. Alternatively, the extraction head can be "scissor-shaped" with a pair of opposing spring loaded compressible jaws which are compressed when the extraction head is retracted and automatically open when the extraction head is extended. The jaws can either have cutting edges or blunt edges for clamping purposes.

For manual removal of vegetation from the soil, the extraction head is placed over the root of the vegetation at ground level and pushed into the soil in such a manner that the root will fit within the V-shaped notch. Because the V-shaped notch will automatically accommodate different sizes of roots, positive engagement of the root will occur regardless of the size of the root. The ratchet is then turned to impart a twisting motion to the extraction head. The extraction head engages the root of the vegetation, and effectively twists the root out of the soil. Removal of the root with the twisting motion is a distinct advantage over other tools because no digging is required and a minimal amount of dirt is removed. Motorized operation is substantially the same.

For large weeds or vines, the vegetation might wrap around the extraction head and housing when the ratchet is turned instead of simply falling off of the device when it is lifted away. By sliding the shaft in and out of the housing, however, the extraction head can be withdrawn into the housing or extended outward. Therefore, by sliding the shaft out of the housing, the extraction head will retract and the vegetation will easily slide off. In addition, dirt and debris will be removed from the extraction head when it is retracted.

When using the "hook-shaped" extraction head to cut stalks or limbs, the hook is placed around the vegetation and the extraction head is retracted. This results in the vegetation being compressed between the cutting edge of the extraction head and the end of the housing, thereby cutting the vegetation. Similarly, when using the "scissor-shaped" extraction head the vegetation is placed between the jaws and the extraction head is retracted to close the jaws on the vegetation. In either mode of operation, a source of rotary power is not required.

An object of the invention is to provide for rotary extraction of vegetation.

Another object of the invention is to extract vegetation with minimal removal of soil.

Another object of the invention is to remove vegetation and its root system.

Another object of the invention is to provide for easy ejection of removed vegetation.

Another object of the invention is to minimize entanglement of vegetation during removal.

Another object of the invention is to provide interchangeable extraction heads to accommodate various types of vegetation.

Another object of the invention is to provide an extraction head that accommodates various sizes of roots.

Another object of the invention is to provide for cutting vegetation above ground.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 9 is an assembled view of an alternate embodiment of the apparatus shown in FIG. 3 in which the extraction head shown in FIG. 5 is used.

FIG. 10 is an alternate embodiment of the housing portion of the apparatus of the present invention.

FIG. 11 is a cross-sectional view of the housing shown in FIG. 10 taken through line 11—11.

DESCRIPTION OF THE PREFERRED EMBODIMENTS

Referring more specifically to the drawings, for illustrative purposes the present invention is embodied in the apparatus generally shown in FIG. 1 through FIG. 12, where like reference numbers indicate like parts. It will be appreciated that the apparatus may vary as to configuration and as to details of the parts without departing from the basic concepts as disclosed herein.

Figures 1, 2:
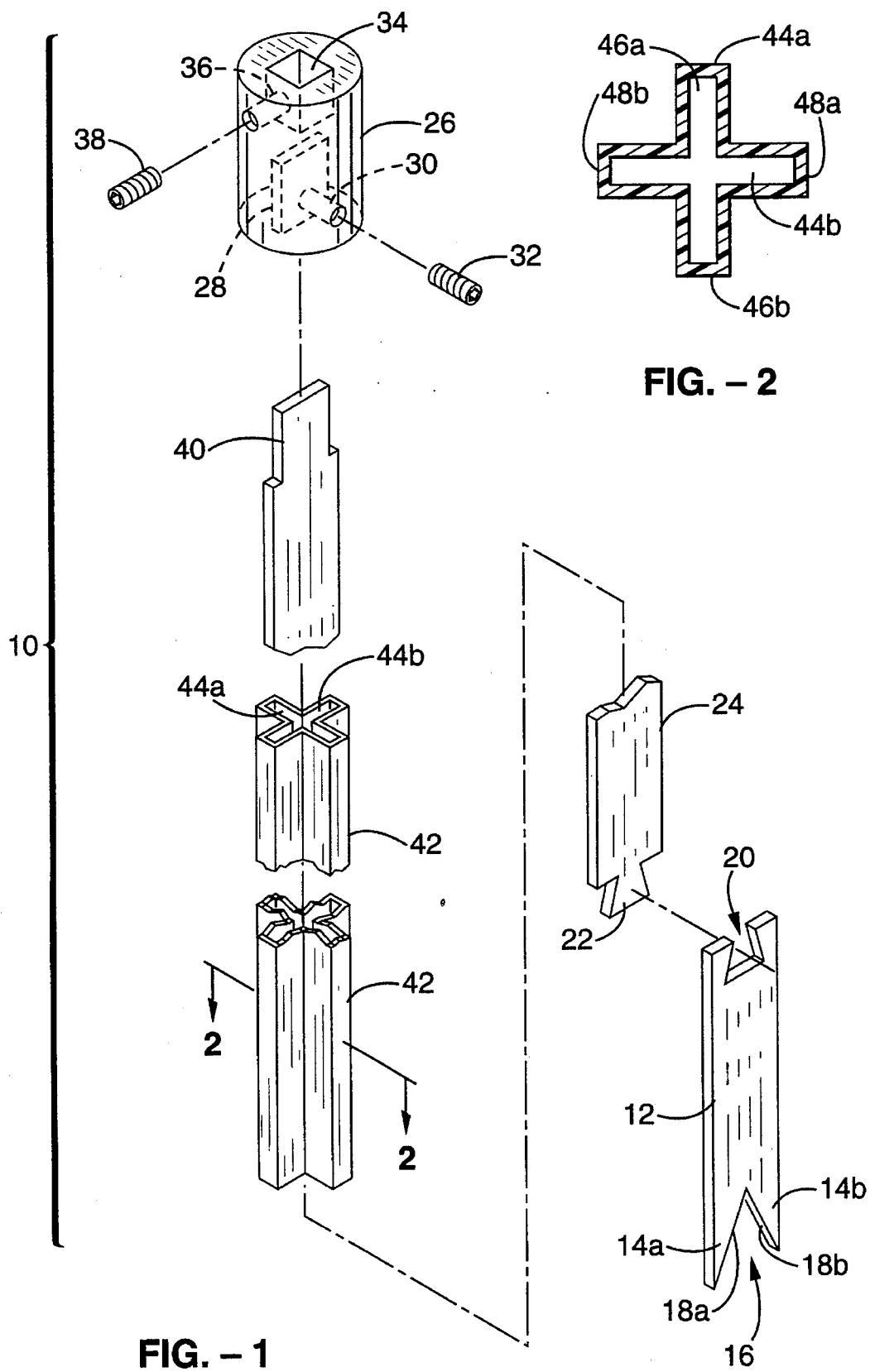
FIG. 1 is an exploded view of the apparatus of the present invention employing an extraction head having two prongs separated by a V-shaped notch.
FIG. 2 is a cross-sectional view of the housing portion of the apparatus shown in FIG. 1 taken through line 2—2.

Referring to FIG. 1, the present invention provides a vegetation extraction device 10 which includes an extraction head 12 for insertion into the soil and the area surrounding the root of a weed or other vegetation to be removed. Located at the distal end of extraction head 12 are a pair of opposing prongs 14a, 14b having pointed ends. Prongs 14a, 14b are separated by a V-shaped cutout or notch 16 having opposing sides 18a, 18b which are anticlinal in relation to distal end of extraction head 12. Preferably sides 18a, 18b should be blunt so that notch 16 only engages the root and does not cut it. Note also, that this configuration of notch 16 is particularly advantageous in that notch 16 can receive roots of various diameters so as to provide positive engagement with the root during removal of the root and vegetation to which the root is joined.

The proximal end of weed extraction head 12 includes a keyed receptacle 20 for coupling to a keyed tab 22 on the distal end of a thin, elongated, generally planar shaft 24. Note that the inside edges of keyed receptacle 20 are cut at an angle in relation to the outside edges of extraction head 12, and that the outside edges of keyed tab 22 are correspondingly angled. This configuration permits keyed tab 22 to be inserted into and removed from keyed receptacle 20 with lateral movement of shaft 24 in relation to extraction head 12, while at the same time preventing separation as a result of longitudinal movement. In this way, extraction head 12 can be easily attached to or detached from shaft 24. Those skilled in the art will appreciate that extraction head 12 and shaft 24 could alternatively be formed as an integral unit, but that such a configuration would result in a loss of the advantages provided by interchangeability of extraction heads.

The proximal end of shaft 24 is coupled to a power transfer coupling 26. The distal end of power transfer coupling 26 includes a rectangular slot 28 into which the proximal end of shaft 24 is inserted. A threaded hole 30 extends from the outer wall of power transfer coupling 26 and into slot 28 for receiving a threaded set screw 32 or the like. By tightening set screw 32, shaft 24 can be firmly coupled to power transfer coupling 26. Those skilled in the art will appreciate that shaft 24 and power transfer coupling 26 could alternatively be coupled by other fastening means such as welding or the like. The proximal end of power transfer coupling 26 includes a square-shaped receptacle 34 for receiving a source of rotary motion such as a standard manual wrench ratchet handle, motorized ratchet handle, electric drill, power-take-off of a tractor, or the like. A threaded hole 36 extends from the outer wall of power transfer coupling 26 and into receptacle 34 for receiving a threaded set screw 38 or the like. By tightening set screw 38, the source of rotary motion can be firmly coupled to power transfer coupling 26 if desired. In the event that power transfer coupling 26 is of a size which results in slot 28 having a narrower width than shaft 24, a tab 40 could be included at the proximal end of shaft 24 having a width matching that of slot 28.

Note that power transfer coupling 26 can be of various alternative configurations. While FIG. 1 shows a cylindrical-shaped member, power transfer coupling 26 can be of a square, rectangular or other shape if desired. Note also that power transfer coupling 26 could be fashioned from a conventional socket of the type used with a ratchet wrench if desired. In that event, the opening normally found at the distal end of a conventional socket for receiving a nut could be used to receive the proximal end of shaft 24.

Figure 3:
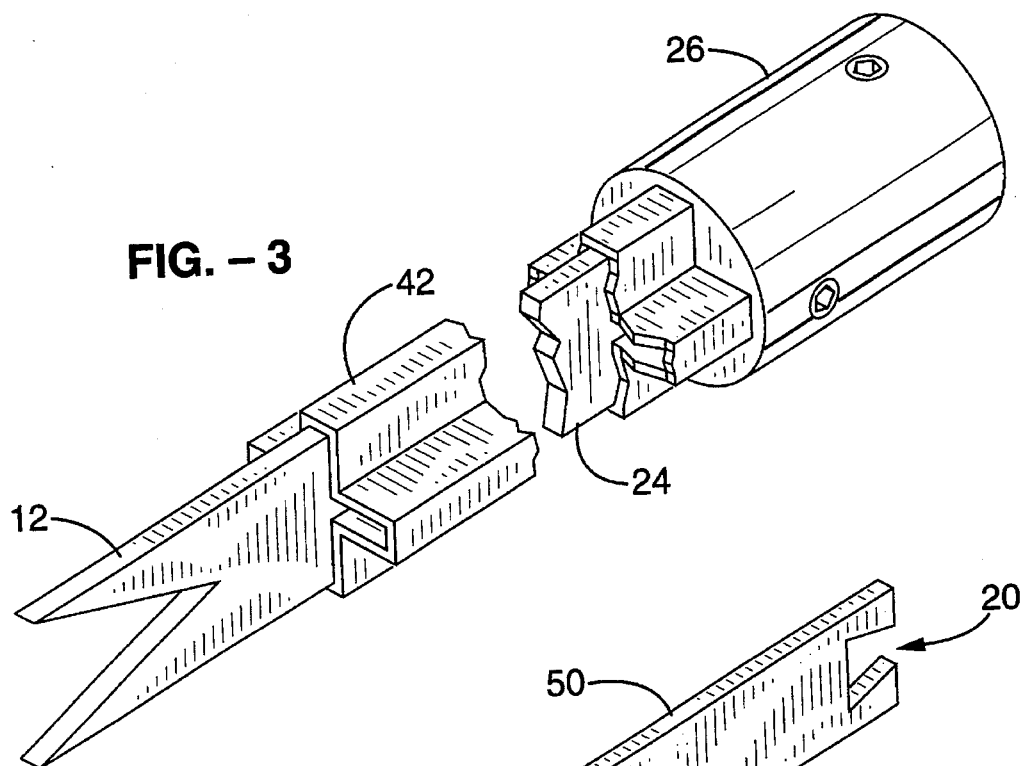
FIG. 3 is an assembled view of the apparatus shown in FIG. 1.

Referring also to FIG. 2 and FIG. 3, shaft 24 is slidably disposed within a housing 42. In the preferred embodiment a housing 42 is extruded from a rigid plastic material or the like and includes a pair of rectangular guide slots 44a, 44b extending between its proximal and distal ends. As can be seen, guide slots 44a, 44b intersect at their centers and are oriented generally perpendicular to each other, thereby forming a "cross-shaped" configuration. As a result of this orthogonal orientation of the guide slots, housing 42 has four wall projections 46a, 46b, and 48a, 48b which extend outward from a central axis. Wall projections 46a, 46b are aligned in the same plane, while wall projections 48a, 48b are aligned in a plane which is perpendicular to the plane in which wall projections 46a, 46b lie. Therefore, as can be seen from FIG. 2, housing 42 has a "cross-shaped" cross-section. In addition, each guide slot has substantially the same cross-sectional area as that of shaft 24 and extraction head 12, and shaft 24 and extraction head 12 are slidably disposed within either guide slot 44a or guide slot 44b.

This particular configuration of housing 42 has several advantages. First, by sliding shaft 24 out of the housing, extraction head 12 will retract into a guide slot. Since the corresponding guide slot is of substantially the same cross-sectional area as extraction head 12, housing 42 slidably engages extracted head 12 and dirt and debris will be "wiped" from extraction head 12 when it is retracted. At the same time, any vegetation which has wrapped around extraction head 12 will be removed. Second, in the event that vegetation wraps around housing 42, the configuration of wall projections 46a, 46b and 48a, 48b will ensure that the vegetation will not be in contact with a large amount of surface area, thereby making it easy to slide the vegetation off of housing 42. Third, extraction heads of various configurations can be accommodated.

Figure 4:
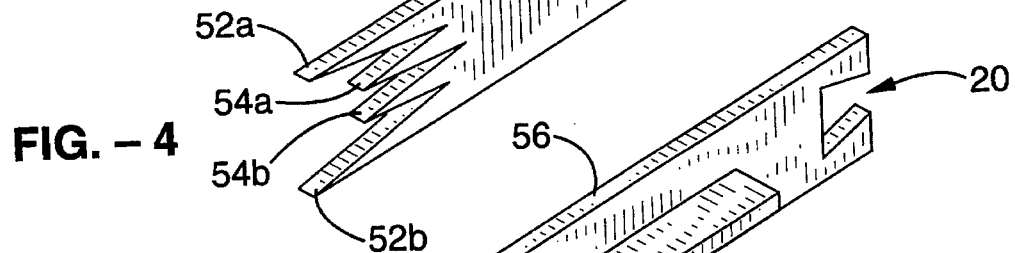
FIG. 4 is a perspective view of a four-prong planar extraction head in accordance with the present invention.
Figure 5:
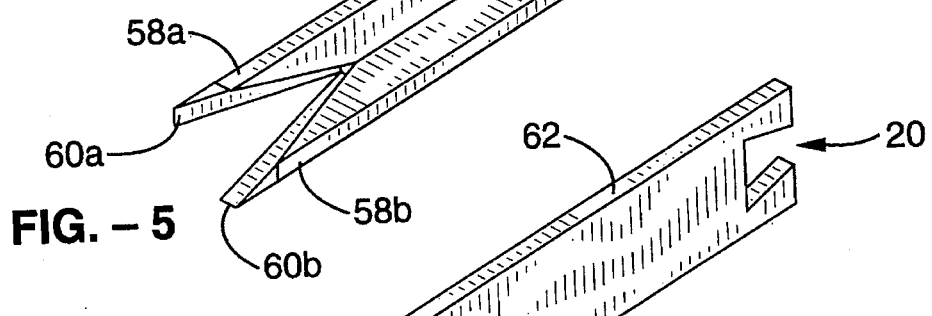
FIG. 5 is a perspective view of an alternative embodiment of a four-prong extraction head in accordance with the present invention.

Referring also to FIG. 4 through FIG. 9, various alternative embodiments of extraction heads are shown. FIG. 4 shows a generally planar extraction head 50 which is similar to extraction head 12, except that four prongs are included. Extraction head 50 includes a pair of opposing outer prongs 52a, 52b, and a pair of opposing inner prongs 54a, 54b. Each is prong is pointed and separated by a V-shaped notch as before, except that inner prongs 54a, 54b are recessed in relation to the distal end of extraction head 50. Referring to FIG. 5, an alternative embodiment of a four prong extraction head is shown. Here, extraction head 56 includes a pair of opposing prongs 58a, 58b which lie in one plane and a pair of opposing prongs 60a, 60b which lie in an orthogonal plane, thereby forming a "cross-shaped" configuration.

Note that a two-prong extraction head as shown in FIG. 1 and FIG. 3 is sufficient for extracting small weeds in lawn areas, whereas a four-prong extraction head as shown in FIG. 5 and FIG. 9 would be more satisfactory for extracting blackberry vines or star-thistle. The four-prong embodiment shown in FIG. 4 can be used for extracting vegetation which has multiple roots near the surface of the soil.

Figure 6:
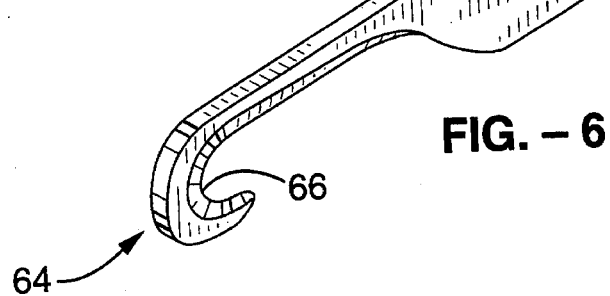
FIG. 6 is a perspective view of a hook-shaped extraction head in accordance with the present invention.
Figure 7:
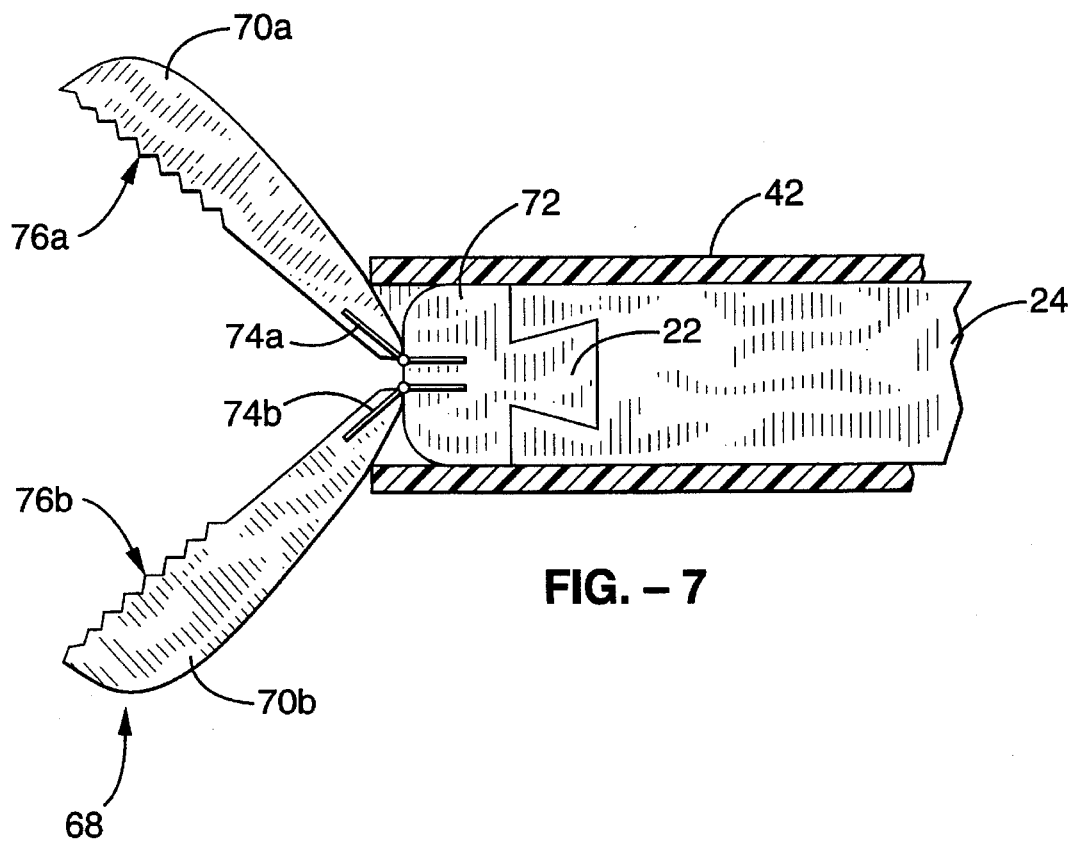
FIG. 7 is side elevation view of a scissor-shaped extraction head in accordance with the present invention in which the head is shown in the extended position in relation to the housing with the jaws open.
Figure 8:
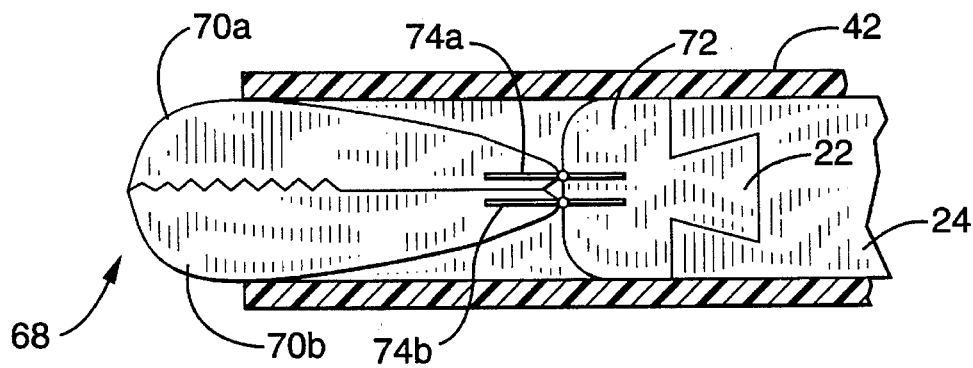
FIG. 8 is a side elevation view of the extraction head shown in FIG. 7 in which the head is shown in a retracted position in relation to the housing with the jaws closed.

Referring to FIG. 6, a "hook-shaped" extraction head 62 is shown. Extraction head 62 includes an arcuate "J-shaped" hook 64 at its distal end and a cutting edge 66 extending along the inside edge of hook 64. This configuration is suitable for cutting stalks of vegetation or for cutting limbs from trees. Alternatively, a "scissor-shaped" extraction head 68 as shown in FIG. 7 could be employed. Extraction head 68 includes a pair of opposing spring loaded compressible jaws 70a, 70b which are joined to a shank 72 with springs 74a, 74b. Springs 74a, 74b are flat springs or the like having a normal bend which holds jaws 70a, 70b open as shown. Referring to FIG. 7 and FIG. 8 together, jaws 70a, 70b are compressed when the extraction head is retracted and automatically open when the extraction head is extended. Jaws 70a, 70b can include blunt serrated edges 76a, 76b for clamping purposes or, alternatively, cutting edges can be used instead of blunt serrated edges.

Preferably the prongs in the extraction heads are formed from a rigid material such as corrosion resistant hardened steel or the like. Not only will use of such material provide for penetrating soil without damage to the extraction head, but permit the apparatus to be used for picking up aluminum cans or other debris on the ground surface. The other components described herein can be fabricated from lightweight, rigid materials such as high impact plastic, aluminum, stainless steel, or the like. Preferably, these materials should also be corrosion resistant since they will be exposed to water and soil acids. Those skilled in the art will appreciate that other configurations of extraction heads could be employed without departing from the invention disclosed herein. However, while other configurations could be employed, the prongs are preferably generally planar. Since the prongs taper to a point, the taper in combination with a generally planar configuration permits the extraction head to penetrate the soil with "knife-like" ease.

Referring to FIG. 1 and FIG. 3 through FIG. 8, note that extraction head 12, extraction head 50, extraction head 62 and extraction head 68 are generally planar. As such, those extraction heads can be used where housing 42 includes either one or two guide slots. However, referring to FIG. 5 and FIG. 9, it can be seen that extraction head 56 incudes two prongs which lie in one plane and two prongs which lie in an orthogonal plane. Therefore, extraction head 56 can be used only where both guide slots 44a, 44b are included in housing 42 and those guide slots are arranged in a corresponding "cross-shaped" configuration.

FIG. 10 and FIG. 11 show an alternative embodiment of the housing for shaft 24. Here, housing 78 is a generally cylindrical tube which includes a rectangular slot 80 extending between each end. Alternatively, a pair of orthogonal slots could be included within housing 78 in a "cross-shaped" configuration. Note, however, that because housing 78 has a continuous outer surface, vegetation which tightly wraps around housing 78 may be difficult to remove due to the large surface area which can be contacted by the vegetation.

Figure 12:
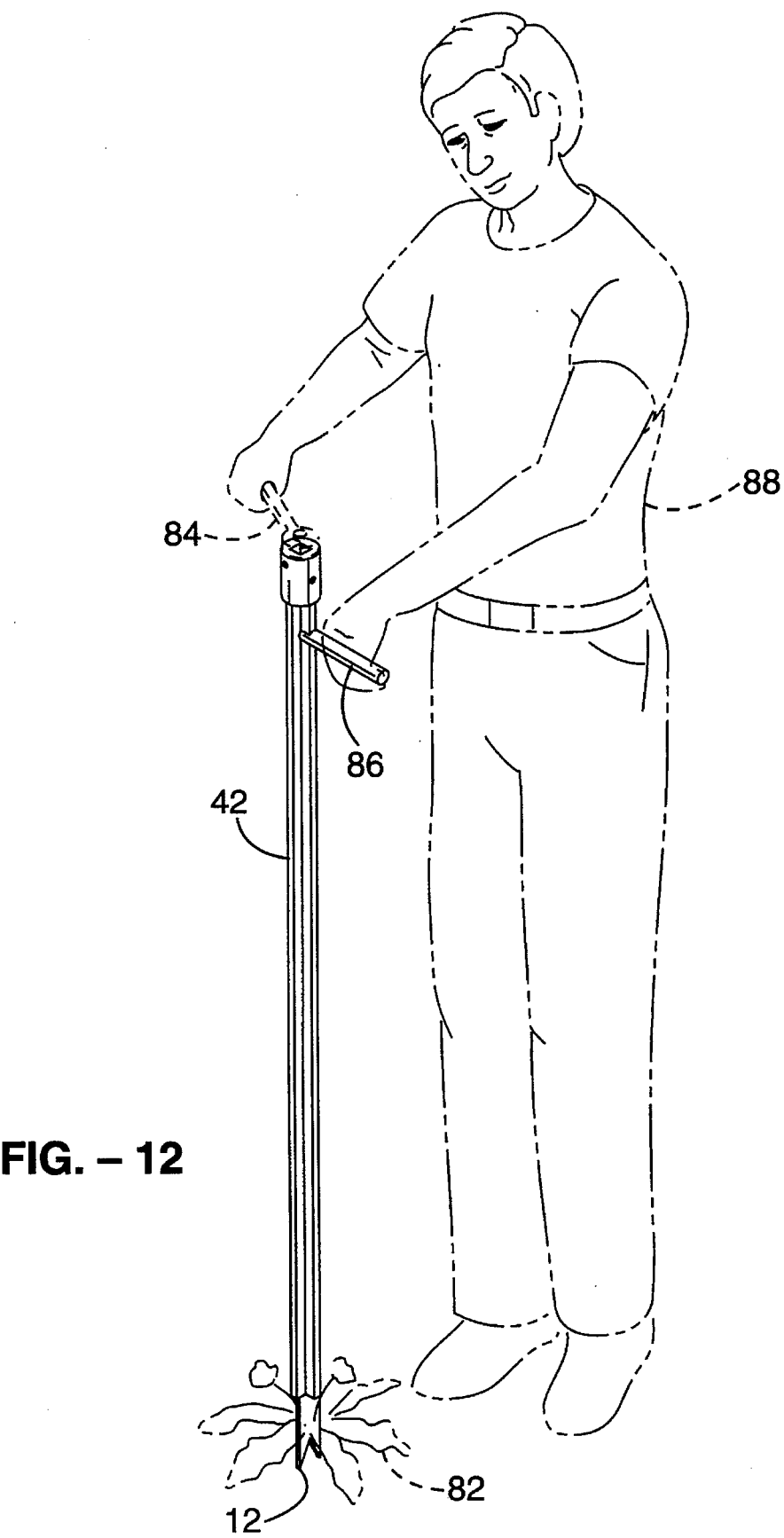
FIG. 12 is a diagrammatic view of the apparatus of FIG. 1 positioned for extraction of a weed shown in phantom.

Referring now to FIG. 12, for manual removal of vegetation 82 from the soil, the extraction head 12 is placed over the root of the vegetation 82 at ground level and pushed into the soil in such a manner that the root will fit within the V-shaped notch 16. Housing 42 is then grasped with one hand and a ratchet 84 or the like which has been coupled to power transfer coupling 26 is rotated with the other hand. Alternatively, a handle 86 which extends outward from housing 42 can be provided for support instead of requiring the user 88 to grasp housing 42. The ratchet 84 is then turned to impart a twisting motion to the extraction head 12. The extraction head 12 engages the root of the vegetation 82, and effectively twists the root out of the soil. To eject the vegetation from the apparatus the user 88 slides shaft 24 toward the proximal end of housing 42 as if to remove the shaft, thereby causing extraction head 12 to retract and the vegetation 82 to fall off. In the event that large vegetation is removed and in the removal process the vegetation wraps around housing 42, the user 88 can easily slide the weed off of the apparatus due to the "cross-shaped" configuration of housing 42. Motorized operation is substantially the same.

When using the "hook-shaped" extraction head 62 to cut stalks or limbs, the hook 64 is placed around the vegetation and the extraction head is retracted. This results in the vegetation being compressed between the cutting edge of the extraction head and the end of the housing 42, thereby cutting the vegetation. Similarly, when using the "scissor-shaped" extraction head 68 the vegetation is placed between the jaws 70a, 70b and the extraction head 68 is retracted to close the jaws on the vegetation. In either mode of operation, a source of rotary power is not required.

Accordingly, it will be seen that this invention provides for the efficient and complete removal of a weed or other vegetation and its root system, and eliminates entanglement which occurs in other extraction devices. Additionally, the invention provides for interchangeability of extraction heads and can be used not only for rotary removal of vegetation but for cutting vegetation if desired. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. An apparatus for removing vegetation, comprising:
   (a) a housing, said housing having first and second ends, said housing including a guide slot extending between said first and second ends;
   (b) a generally planar shaft, said shaft having first and second ends, said shaft slidably disposed within said guide slot;
   (c) an extraction head coupled to said first end of said shaft; and
   (d) coupling means for coupling said second end of said shaft to a source of rotary motion.

2. An apparatus as recited in claim 1, wherein said extraction head includes a plurality of prongs separated by a V-shaped notch.

3. An apparatus as recited in claim 1, wherein said housing includes a second guide slot, said first and second guide slots intersecting at their centers, said second guide slot positioned substantially perpendicular to said first guide slot.

4. An apparats as recited in claim 3, wherein said housing has a cross-shaped cross-section.

5. An apparatus as recited in claim 1, wherein said coupling means has first and second ends, said first end including a receptacle for coupling said coupling means to said source of rotary motion, said second end including a slot, said second end of said shaft engaging said slot.

6. An apparatus as recited in claim 1, further comprising means for detachably coupling said shaft and said extraction head.

7. A vegetation removal device, comprising:
   (a) an elongated, generally planar shaft having a proximal end and a distal end, said proximal end including a receptacle configured and structured for coupling to a source of rotary motion;
   (b) an extraction head, said extraction head detachably coupled to said distal end of said shaft; and
   (c) a housing, said housing having a proximal end and a distal end, said housing including a slot of generally rectangular cross-section extending between said proximal and distal ends of said housing, said shaft slidably disposed within said slot.

8. A vegetation removal device as recited in claim 7, wherein said shaft and said slot have substantially identical cross-sectional areas.

9. A vegetation removal device as recited in claim 7, wherein said housing includes a second guide slot, said first and second guide slots intersecting at their centers, said second guide slot positioned substantially perpendicular to said first guide slot.

10. A vegetation removal device as recited in claim 9, wherein said housing has a cross-shaped cross-section.

11. A vegetation removal device as recited in claim 9, wherein said extraction head includes a plurality of prongs separated by a notch, said notch having anticlinal sides.

12. A rotary vegetation extractor, comprising:
    (a) an elongated shaft, said shaft having a first end and a second end;
    (b) power coupling means for coupling said first end of said shaft to a source of rotary motion;
    (c) an extraction head, said extraction head having a first end and second end;
    (d) extraction head coupling means for detachably coupling said second end of said shaft to said extraction head; and
    (e) a housing, said housing including first and second intersecting guide slots, said second guide slot positioned substantially perpendicular to said first guide slot, said shaft and said extraction head slidably disposed within at least one of said guide slots.

13. A rotary vegetation extractor as recited in claim 12, wherein said housing has a cross-shaped cross-section.

14. A rotary vegetation extractor as recited in claim 13, wherein said coupling means has first and second ends, said first end including a receptacle for coupling said coupling means to said source of rotary motion, said second end including a slot, said second end of said shaft engaging said slot.

15. A rotary vegetation extractor as recited in claim 14, wherein said extraction head includes a plurality of prongs separated by V-shaped notch.

\* \* \* \* \*